Jan. 30, 1951     A. MACKMANN     2,539,449
MACHINE FOR FORMING TAPERED TOOTHED MEMBERS
Filed March 17, 1947     5 Sheets-Sheet 5
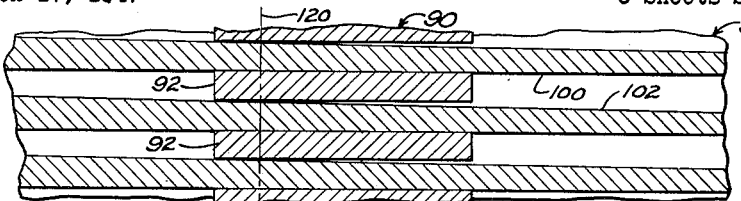
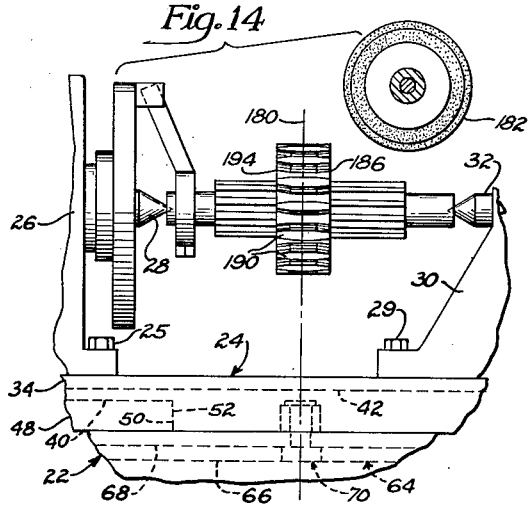
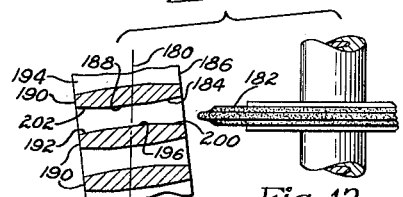
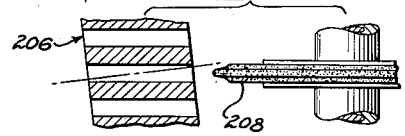
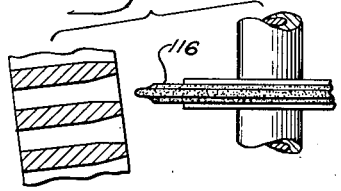
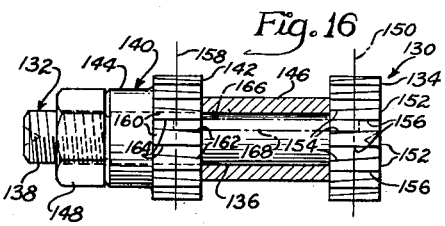
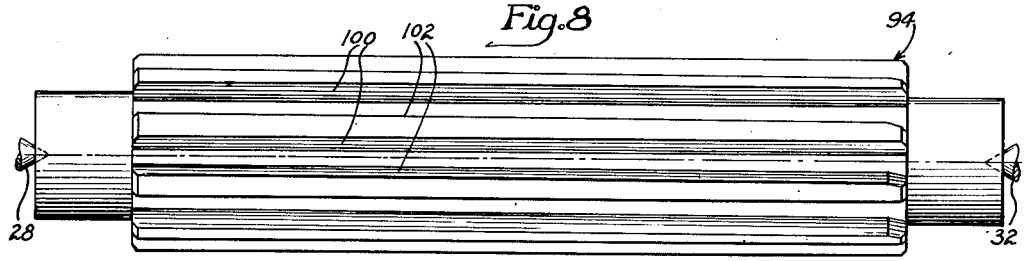
INVENTOR.
Arthur Mackmann
BY Louis Sheldon
Atty.

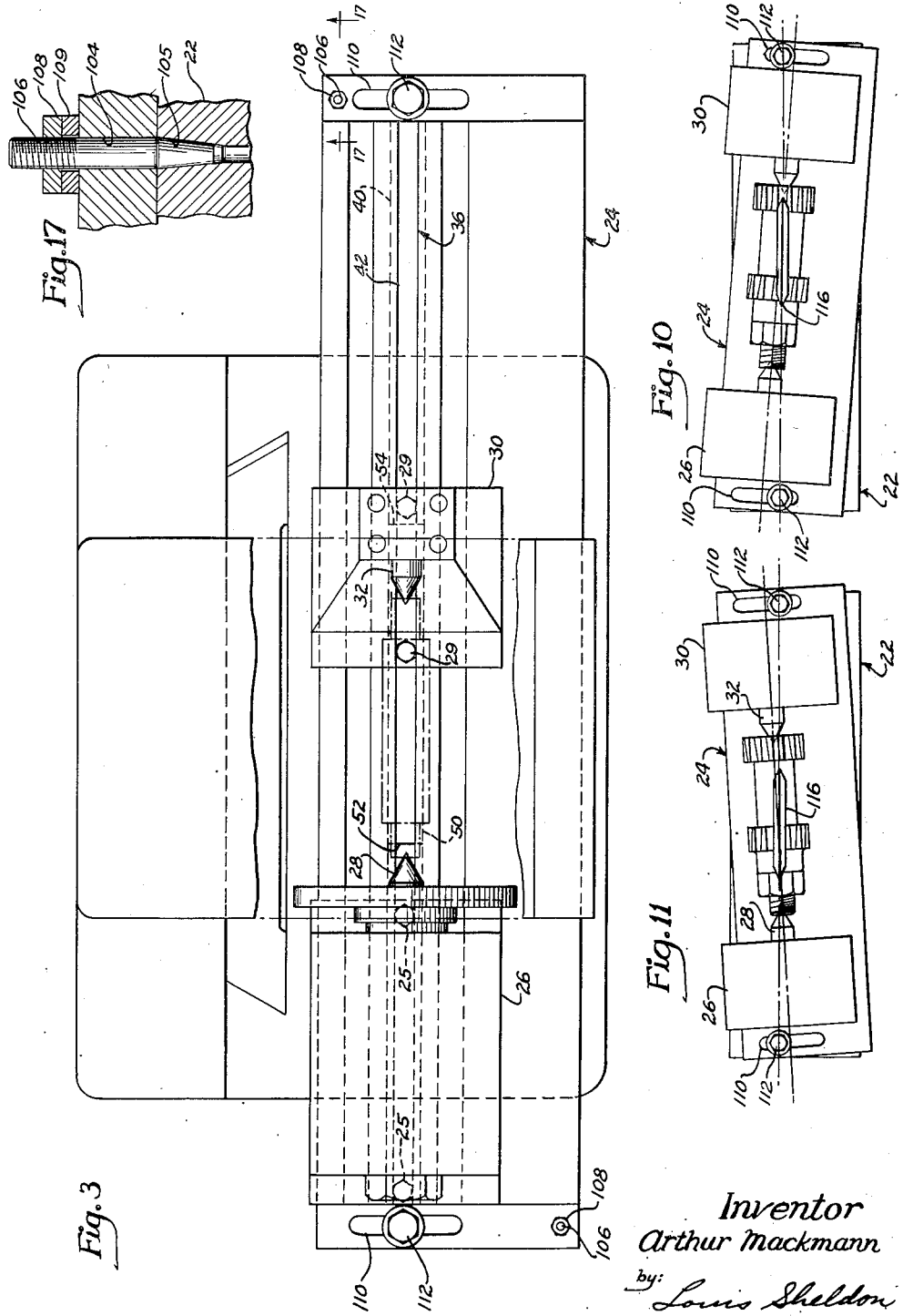

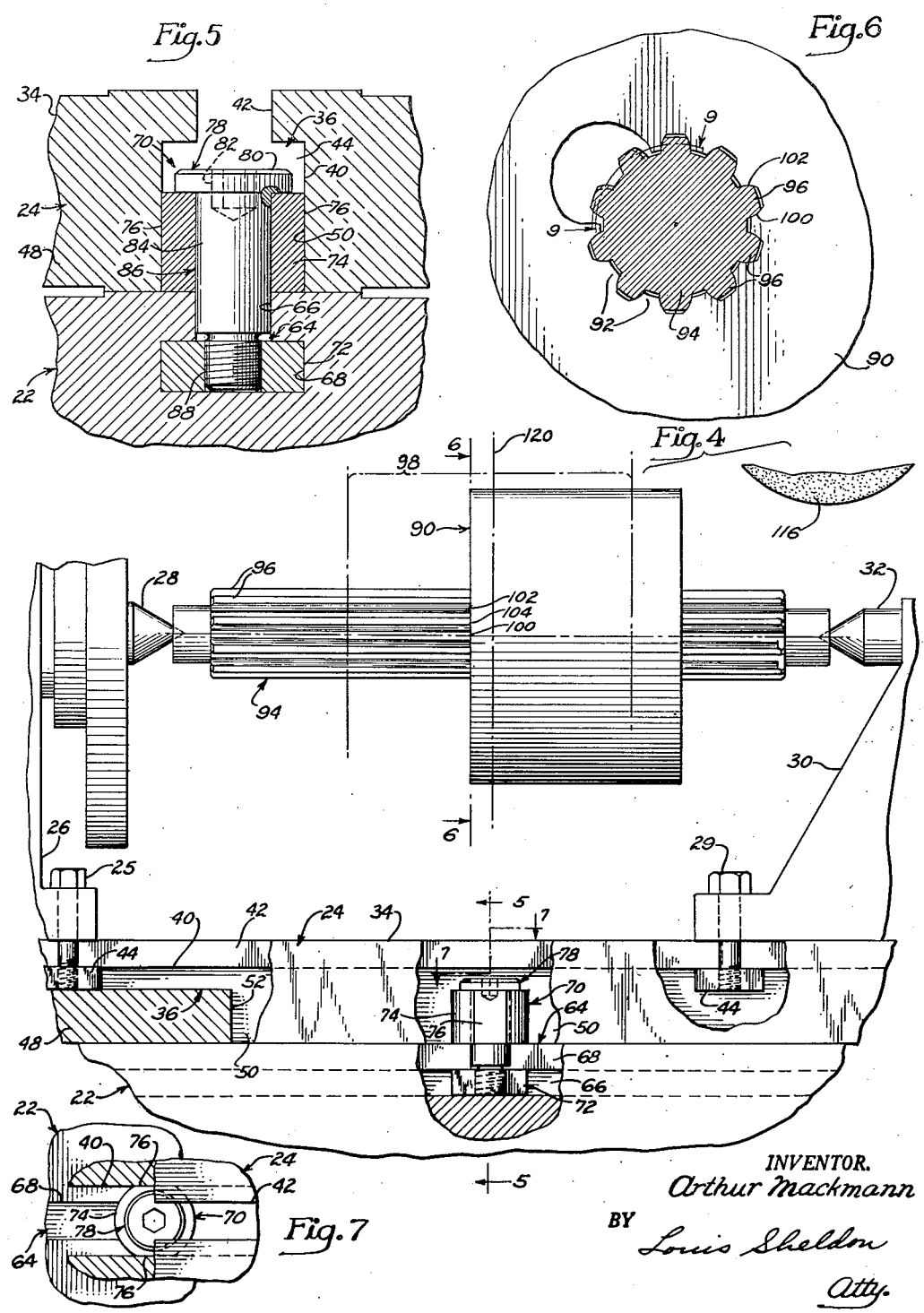

Patented Jan. 30, 1951

2,539,449

UNITED STATES PATENT OFFICE 2,539,449

MACHINE FOR FORMING TAPERED TOOTHED MEMBERS

Arthur Mackmann, Chicago, Ill.

Application March 17, 1947, Serial No. 735,180

5 Claims. (Cl. 51—92)

This invention relates to tapered or skewed ear and spline teeth and their manufacture, including methods and apparatus therefor.

Tapered spline arbors are widely used for holding splined parts. A splined tapered arbor most commonly in use today is one in which the pitch lines of the teeth form a cone, the width of each tooth increasing with the radius thereof. Such teeth, even when generated, are of constantly varying profile relative to the arbor axis, because of the constantly increasing diameter. Moreover, such profile, being normal to the tapered surface and hence at an acute angle to the axis of the arbor, is by virtue thereof not coplanar with the profile of any of the internal spline teeth of a workpiece, since the pitch lines of such teeth form a cylinder. To prepare a conically tapered spline arbor for receiving the internal splines of a workpiece, the arbor teeth are ground. Such teeth, when ground to precision tolerances, are commonly ground one side of a tooth at a time by a formed grinding wheel traveling in a direction at an angle to the axis of the conical arbor and cutting the entire profile at one time. This operation introduces serious additional deviation of the tooth profile, relative to the arbor axis, from the proper profile, for the reason, among others, that it removes more material from the outside diametral portion of the tooth than from the root portion of the tooth.

Even if the conically tapered spline arbor were free of all of the foregoing disadvantages it would still be unsatisfactory, because theoretically only point contact, and practically only line contact at best, would take place between any internal tooth of a workpiece and any arbor tooth, and this would occur only where the width of the internal spline cavity matches the width of the arbor tooth.

Among the objects of my invention are to provide a wedging spline arbor, the pitch lines of whose teeth form a cylinder, said arbor having substantially more accurate tooth profile, relative to the arbor axis, along the wedging surfaces thereof and affording practically an area of full profile contact, and being capable of more economic manufacture, than the conventional wedging spline arbor.

For the external grinding of cylinders, the conventional machine is generally equipped with an upper work-supporting table readily adjusted about a stationary pivot for taper grinding. Such machines are used extensively in the grinding of mandrels and arbors with tapers as fine as .0001 inch per foot. With a standard spline grinding machine, in order to make the necessary adjustments preparatory to grinding conical splines, the tailstock is adjusted as one would adjust the tailstock of a lathe for taper turning, i. e., in a straight line horizontally at right angles to the axis of the center of the headstock, so that the axes of the centers of the headstock and tailstock, respectively, at the completion of the adjustment are parallel but disalined. This setting causes eccentricity, out-of-roundness and poor tooth spacing, as is well known to those familiar with the art of spline and gear tooth grinding.

It is accordingly a further object of my invention to provide a spline and gear tooth grinding machine in which the tailstock and headstock centers are co-axial irrespective of any adjustment made for the purpose of grinding, tapering or skewing teeth in a direction non-parallel to the axis of the workpiece.

It is also an object of my invention to provide a tooth grinding machine in which the headstock and tailstock centers are co-axially adjustable to the length of the work, and in which the headstock and tailstock are pivotable as a unit about a vertical axis whose position is variable between said centers.

Another object is to provide a tooth grinding machine for so forming cylindrical external arbor teeth, adapted to be engaged by the cylindrical internal spline teeth of a gear, that the spaces between consecutive arbor teeth are tapered, and the arbor teeth, in the plane at which the wedging of the gear with the arbor takes place, have the same profile as the gear spline teeth.

It is a further object to provide a tooth grinding machine for grinding a plurality of gears on a single work support in such manner that the tooth profiles of each gear in a given plane normal to the gear axis are uniform, without requiring the disassembly of either gear from the support therefor, and for a single setting of the headstock and tailstock on the support for the headstock and tailstock.

An additional object is to provide a gear arbor which is cylindrical and in which there is full length surface contact between the internal teeth of the workpiece and the arbor teeth on the load side, and at least line contact on the wedging side.

It is also an object of my invention to provide means and a method for grinding crowned gear teeth. It is customary to skew gear teeth a very slight amount to allow mating gear tooth surface alinement when the axes of the gears are sprung out of parallel a known amount under known load. At no load therefore, i. e., when the axes are parallel, the mating tooth surfaces are misalined. Such skew teeth in the past have had the drawback of high tooth profile error and consequent low load contact area.

It is a further object to provide a novel and improved means and method for making skew gears with minimum tooth profile error.

Further objects and advantages of the invention will appear as the description proceeds.

The invention will be better understood upon reference to the following description and accompanying drawings, in which:

Fig. 3 is a fragmentary plan view taken as indicated by the line 3—3 in Fig. 1.

Fig. 4 is an enlarged fragmentary view, partly in section and partly in elevation, of a portion of the structure appearing in Fig. 1.

Fig. 5 is an enlarged fragmentary sectional view taken as indicated by the line 5—5 in Fig. 4.

Fig. 6 is an enlarged fragmentary sectional view taken as indicated by the line 6—6 in Fig. 4.

Fig. 7 is a fragmentary plan view taken as indicated by the line 7—7 in Fig. 4.

Fig. 8 is an enlarged fragmentary elevational view of a tapered tooth cylindrical spline arbor made in accordance with my invention.

Fig. 9 is a fragmentary sectional view taken as indicated by the curved line 9—9 in Fig. 6, and turned clockwise 90°.

Figs. 10 and 11 are somewhat diagrammatic views similar to Fig. 3 but with the table, carrying the headstock and tailstock, in different adjustments for enabling the teeth of the workpiece to be taper ground.

Fig. 12 shows one of the positions occupied by a gear in relation to the grinding wheel when the gear teeth are skew-ground in accordance with my invention.

Fig. 13 is a view similar to Fig. 12 but shows a gear whose teeth are tapered in both directions but only at one end in accordance with my invention.

Fig. 14 is a fragmentary elevational view showing a portion of the structure appearing in Fig. 1 with a gear which has been crowned in accordance with my invention.

Fig. 15 shows one of the positions occupied by the crown gear of Fig. 14 in relation to the grinding wheel for taper grinding the teeth of the gear.

Fig. 16 shows an arbor on which are mounted two workpieces on which tapered teeth may be cut by adjusting the table to the position shown in Fig. 10 and then to the position shown in Fig. 11 for producing teeth with oppositely inclined tapers.

Fig. 17 is an enlarged sectional view taken as indicated by the line 17—17 in Fig. 3.

Figure 1:
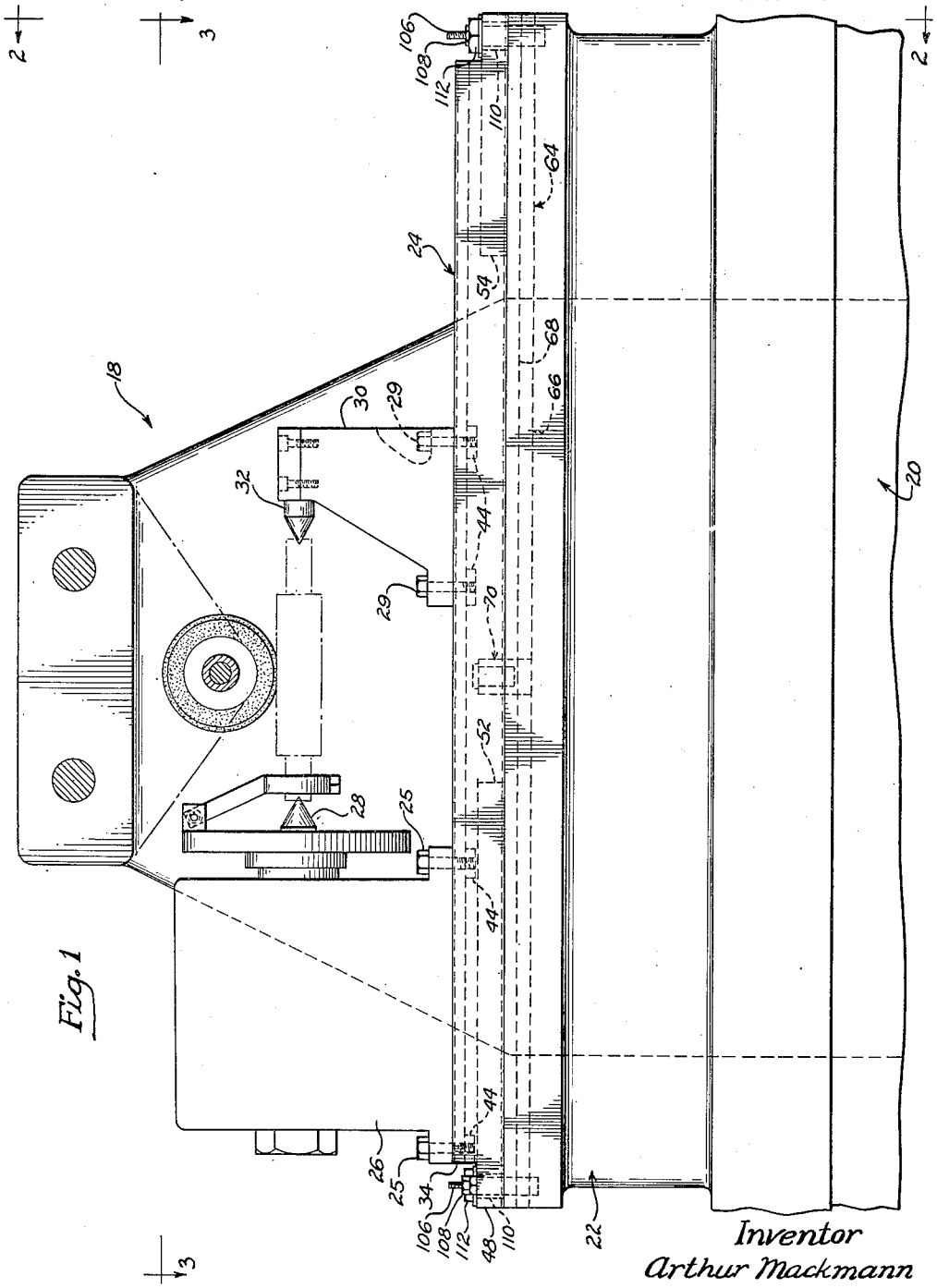
Fig. 1 is a fragmentary side elevational view of a taper tooth grinding machine constructed in accordance with my invention.
Figure 2:
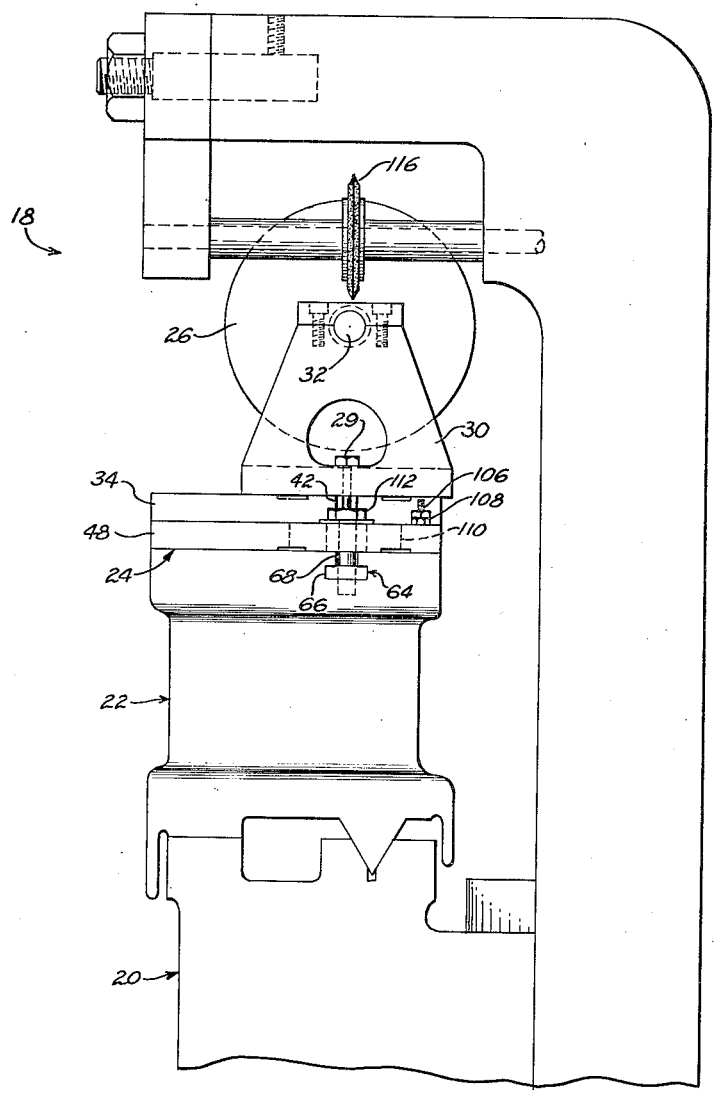
Fig. 2 is an end elevational view of the same, taken as indicated by the line 2—2 in Fig. 1.

Referring now more particularly to the drawings, there is shown generally at 18 a gear and spline tooth grinding machine comprising a base 20 on which is disposed a longitudinally slidable bed 22 supporting a relatively adjustable table 24 on which are mounted as by bolts 25 a headstock 26 having a center 28 and, as by bolts 29, a tailstock 30 having a center 32. The headstock 26 is preferably fixed relative to the table 24, and the tailstock 30 is preferably longitudinally adjustable relative to the headstock, and their centers 28 and 32 are coaxial.

The table 24 has a raised portion 34 having a full length inverted T-slot 36 comprising a lower relatively wide part 40 and an upper relatively narrow part 42. The shanks of the tailstock and headstock bolts 25 and 29 extend through and are movable along the narrow part 42 of the T-slot 36 and the cooperating nuts 44 are disposed in and are movable along the relatively wide part 40 of said T-slot. The lower portion 48 of the table 24 has a slot 50 constituting a downward continuation of the relatively wide portion 40 of said T-slot 36 to the bottom of the table and of substantially less length and has closed ends 52 and 54 which are disposed respectively adjacent the inner ends of the headstock 26 and tailstock 30 when the headstock and tailstock are in their substantially endmost positions.

The bed 22 has in the top thereof an inverted T-slot 64 comprising relatively wide and narrow parts 66 and 68.

In accordance with my invention a pivot assembly generally indicated at 70 is provided to cooperate with the bed 22 and table 24 in such manner that the table can be turned in a horizontal plane relative to the bed and secured in the desired adjustment. The pivot assembly 70 comprises a square nut 72 adapted to have a sliding fit in the wide part 68 of the lower T-slot 64, a bushing 74 having diametrically opposite flat sides 76 adapted to have a sliding fit with the sides of the closed slot 50 and the adjacent relatively wide part 40 of the upper T-slot 36, and a bolt 78 having its head 80 formed with a wrench socket 82, disposed over the bushing 74, with the smooth upper part 84 of its shank 86 extended through the bushing and into the relatively narrow part 66 of the lower T-slot 64 and terminating short of the square nut 72, the lower part 88 of the shank being of reduced diameter and threaded into the nut. The flat sides 76 on the bushing 74 are for reducing wear, but, if desired, the bushing may be completely round externally and have sliding contact with the sides of the closed slot 50. The wrench socket 82 may be reached by a wrench passed through the relatively narrow part 42 of the upper T-slot 36. The pivot assembly 70 is thus adjustable lengthwise of the bed 22 and table 24 and is operative to pivot the table relative to the bed at any vertical axis within the limits defined by the ends 52 and 54 of the slot 50 in the table.

The pivot assembly 70 is assembled with the bed 22 and table 24 as follows: It it first assembled with the bed by placing the square nut 72 and the bolt shank 86, assembled therewith, into the lower T-slot 64, the bushing 74 being held elevated in order to slide over the top of the bed 24, preferably to an intermediate part of the length of said T-slot 64. The table 24 is then placed over the bed 22 with the slot 50 over the pivot assembly 70, and is then permitted to descend into contact with the top of the bed, so that the bushing 74 and bolt 78 of the pivot assembly are received in the slot 50. A thumb and finger may be introduced through the relatively narrow part 42 of the upper T-slot 36 into engagement with the bushing 74 to move the pivot assembly 70 as a unit to the desired position, the selection of which is to be determined as will appear, and then a socket wrench is passed down through said part 42 of the upper T-slot into the socket 82 of the pivot assembly bolt 78 to tighten the pivot assembly and thus fix the pivot axis of the table 24.

Those familiar with the art of external grinding of cylinders know that machines for that purpose are generally equipped with a universal supplementary table which has a fixed pivot and may readily be adjusted thereabout for taper grinding. Most commonly, such machines are used for the grinding of mandrels and arbors, tapering from as fine as .0001" per foot of length upward. Tapered spline arbors are very widely used for holding splined parts. The grinding of such an arbor to precision tolerances involves considerable difficulty due to the fact that the tapering of the tooth profiles introduces excessive tooth profile errors, making the arbor unreliable for its intended purpose. The most commonly known tapered spline arbor has its teeth tapered in such manner that the pitch lines of the teeth are elements of a cone rather than a cylinder. As such an arbor is ground with a grinding wheel traveling at an angle to the axis of the arbor, the tooth profile is ever changing from one end of the arbor to the other, due to the fact that the wheel form that produces the tooth spaces remains constant, while the tooth center-line to tooth center-line spacing is changing because of the conical envelope of the tapering pitch. If the tapered arbor were ground by the generating method, the profile would likewise change due to the pitch change, as is well known to those skilled in the art.

My invention concerns, among other things, a method of manufacturing tapered spline arbors with no change in tooth profile at one side of each tooth and a very slight change in tooth profile on the other side of each tooth, the profile change being so controlled that at a certain desired location the profile on the second side is the same as on the first side, and the change in profile on the second side in both directions from that location is extremely gradual. This change in profile is entirely with reference to the axis of the arbor. This method is very economical because the arbor can be ground straight and then the position of the arbor can be changed to the desired taper and the other side of the tooth ground angular or skewed to its axis. The degree of taper is generally selected by the tool designer to be equal to the maximum variation in the splines of a workpiece plus a desired amount to insure a press fit and an added amount for easy starting engagement.

Assume by way of example a workpiece 90 to have internal spline teeth 92 having a length of 4" with a tolerance of .002" in tooth thickness, the pitch lines of the teeth forming a cylinder, the workpiece being held on a cylindrical spline arbor 94 made in accordance with my invention and whose spline teeth 96 are, say 12" in length. When using an arbor having spline teeth of the length mentioned, the wedging contact for optimum results should take place within the 6" intermediate zone indicated at 98. It will be noted that one side 100 of each arbor tooth 96 is parallel to the axis of the arbor and that the other side 102 is skewed slightly to said axis (the taper being exaggerated on the drawings for visual purposes) so that there is a tapered groove 104 formed between the parallel side 100 of one spline tooth and the adjacent skewed side 102 of the next spline tooth, the width of said groove at the left end of the zone 98 being selected as equal to the minimum internal spline tooth thickness of a workpiece adapted to be accommodated on the arbor 94 used. If the workpiece 90 is made as above noted, it should automatically be wedged on the arbor 94 within the limits of the zone 98 of the arbor. A very slight axial pressure of the workpiece 90 toward the end 106 of the arbor 94 will bring about a wedging engagement between the internal teeth 92 of the workpiece and the arbor teeth 96, forcing the workpiece spline teeth into full length and area contact with the parallel sides 100 of the arbor teeth.

In grinding an arbor such as the arbor 94 in a conventional spline grinding or surface grinding machine, it is obvious that it would be desirable to grind in such manner that the most accurate tooth profile should be within the arbor zone 98, since all of the clamping pressures are preferably exerted within that length. With standard grinding machines it is customary to grind the taper solely by adjusting the tailstock as one would in a lathe when adjusting its tailstock for taper turning. This causes a parallel disalinement of the axes of the headstock and tailstock centers. Anyone familiar with the precision grinding of cones and cylinders when the axes of the respective centers are disalined, although parallel, knows that such disalinement will cause the work to be eccentric and, if gear or spline teeth are being ground, to have poor tooth spacing, so that it is apparent that the most accurate tooth profile (which, it is evident, is not completely accurate) could occur only at the very end of the headstock center, inasmuch as that is the point about which the arbor to be splineground pivots in a conventional grinding machine, and there are generally no spline teeth at that location.

In accordance with my invention, alinement of the axes of the headstock and tailstock centers is rigidly maintained, because the headstock 26 and tailstock 30 are initially so adjusted and clamped on the table 24 as to form with the table a rigid unit, and this unit is then swiveled about the axis of the pivot assembly 70, after said assembly is adjustably fixed on the bed 22 of the machine tool 18. The position of the pivot assembly 70 may be selected at will. For the arbor 94 the axis of the pivot assembly 70 is preferably established midway of the length of the zone 98.

Assuming the pivot assembly 70 is assembled with the bed 22 and table 24, as above noted, my method may be practiced as follows. The table 24 is shifted, if necessary, to bring each of its leader pin holes 104 in register with the respective tapered leader pin holes 105 in the bed 22, whereupon the leader pins 106 are inserted in said registering holes, the inner end 107 of each pin having a taper fit in the hole 105 and each pin passing through a nut 108 and washer 109, the nut being operative to loosen the taper fit when the pin is to be removed. Thus the T-slots 36 and 64 are registered. The table 24 has transverse end slots 110 accommodating clamping screws 112 threaded into the bed 22, and these screws are now tightened, and headstock and tailstock centers 28 and 32 are of course coaxial, and the tailstock 30 is then adjusted toward the headstock 26, a cylindrical arbor blank having unskewed rough cut splines is placed between and supported by the headstock and tailstock centers, and the tailstock clamping screws 29 are then tightened. The grinding wheel 116, carried by the base 20 and having the profile of the internal spline teeth of workpieces to be accommodated by the arbor to be produced, is adjusted to the desired depth of arbor spline teeth to be finish-ground. Due to the alinement of the bed 22 and table 24, the arbor blank axis will lie in the median plane of the grinding wheel normal to the grinding wheel axis, and the arbor will travel in a direction parallel to its axis so that the spline teeth of the arbor will be parallel-ground, both sides of each tooth being ground to slightly over the high limit of tooth thickness. (To be sure, I could commence with an uncut cylindrical arbor blank and, with the same setting of the machine, use the grinding wheel to form the spline teeth to the same limit of tooth thickness.) With the pivot assembly bolt 78 loose, the pivot assembly 70 is now moved until its pivot axis is midway or approximately midway of the length of the zone 98, and the pivot bolt is then tightened. Now the leader pins 106 are removed, the clamping screws 112 are loosened and the table 24 is swiveled about the pivot assembly 70 to the extent required by the specifications of the job to obtain the desired degree of spline tooth taper, and then the clamping screws are again tightened. Then one side, only, of each spline tooth is skew-ground as shown at 102 to the proper size, the other side 100 having been previously, as noted above, parallel-ground slightly oversize.

There is thus produced a finished skew tooth cylindrical spline arbor 94, each spline tooth having one side 100 parallel to the arbor axis, with a true tooth profile throughout, and the other side 102 skewed to the arbor axis, with a true tooth profile in the plane, indicated by the dash-dot line 120, containing the axis of the pivot bolt 78 and normal to the arbor axis, said plane being midway or approximately midway of the length of the zone 98 depending on the position of the pivot bolt axis during the taper grinding operation, and the tooth profile in both directions from said plane on said skewed side changing progressively but extremely gradually, all with one setting of the headstock 26 and tailstock 30.

The width of the groove 104 at said plane 120 is equal to the average width of the internal teeth of workpieces adapted to be accommodated by the arbor 94, so that, assuming the internal teeth of the workpiece to be of such average width, the left end of each such internal tooth will wedge against the skew side 102 at said plane and the parallel side 100 forming each such arbor groove, with perfect profile engagement with both sides of the groove at the skew side in said plane and complete area contact with said skew side for a slight distance fore and aft of said plane, and of course with full length and height contact with the parallel side of the groove. If a workpiece having internal teeth of slightly greater or smaller width than the average is applied to the arbor 94, the wedging engagement will occur within the length of the zone 98 and respectively to the right or left (Figs. 4 and 6) of the plane 120, and although theoretically the skew side profile at either such location out of said plane is not perfectly true, the difference from the true profile is so slight that, when the workpiece is wedged on the arbor, there actually occurs substantially a full profile and slight area wedging engagement between the left end of each internal tooth of the workpiece and the skew side 102 of the groove 104, with of course full area length and width engagement at the parallel side 100 of the groove. A workpiece 90 having internal teeth 92 of slightly less than average thickness for the arbor 94 is illustrated in Figs. 4, 6 and 9.

The parallel side 100 of each arbor spline groove 104 is preferably located as shown, i. e., spaced clockwise from the skew side 102 when the arbor 94 is viewed from the tailstock end, so that said parallel side will take the load when the workpiece is subjected to turning operations.

A two-piece spline arbor also can be formed very accurately with my machine in one setting of the headstock 26 and tailstock 30 without disturbing the co-axial alinement of the headstock and tailstock centers 28 and 32 and is particularly useful where the workpiece is relatively long, since it affords a wedging support at substantially spaced portions lengthwise of the workpiece. Such an arbor is applied to end portions of an internally splined workpiece. An important feature of my invention is that it is capable of extremely accurate multiple tooth grinding, and a two-piece arbor such as that shown in Fig. 16 may be produced in accordance with my invention. In Fig. 16 there is shown generally at 130 such a two-piece arbor comprising a body 132 having a head 134 and a stem 136 with a threaded end 138, a sleeve 140 about the stem and having a head 142 and a shank 144, said heads being separated by a spacer collar 146, and a nut 148 applied to the threaded end of the stem and serving to hold the two heads and collar in rigid assembly. The arbor, with the heads 134 and 142 blank, is placed between and supported by the axially alined headstock and tailstock centers 28 and 32, the table 24 is adjusted, if necessary, to enable the header pins 106 to be inserted and secured in place, so that the T-slots 36 and 64 are held in register, the table is clamped by the screws 112 to the bed 22, the grinding wheel 116 is adjusted to the desired spline tooth depth, and the machine operated to cut spline teeth on both arbor heads 134 and 142 with both sides of each tooth parallel to each other and to the arbor axis.

The pivot assembly 70 is then shifted along the registered T-slots 36 and 64 until the pivot assembly axis is in the normal plane indicated by the dash-dot line 150, passing midway or substantially midway of the axial length of the arbor head 134, the table clamping bolts 112 are then loosened, the leader pins 106 are removed, the table 24 is swiveled about the axis of the pivot assembly to the desired skew angle, as shown exaggeratedly in Fig. 10, and reclamped to the bed 22, the grinding wheel 116 is positioned between the two arbor heads 134 and 142 and adjusted to the desired spline depth, and then one side of each spline tooth 152 of the arbor head 134 is skew-ground, as shown exaggeratedly at 154, the other side 156 of each tooth being untouched and hence parallel to the arbor axis. The table 24 is then unclamped, its T-slot 36 is reregistered with the T-slot 64 in the bed 22, the pivot assembly 70 is slid until its axis lies in the normal plane represented by the dash-dot line 158, passing midway or substantially midway of the axial length of the arbor head 142 and then tightened, the table is then swiveled in a direction opposite to the first direction about the pivot assembly axis to the desired skew angle, as shown exaggeratedly in Fig. 11, and reclamped to the bed 22, and, with the grinding wheel 116 positioned between the arbor heads 134 and 142 at the desired depth, one side of each spline tooth 160 of the arbor head 142 is skew-ground as shown exaggeratedly at 162, the other side 164 of each tooth being untouched and hence parallel to the arbor axis.

Now the collar 146 is removed, a workpiece 166 slipped onto the arbor stem 136 with its teeth, of which one is shown at 168, wedged at one end with the teeth 152 of the head 134, and the arbor sleeve 140 is slipped onto the stem and its teeth 160 wedged with the other end of the workpiece teeth, as shown in Fig. 16, the wedging engagement being of the character shown in Fig. 9 and above described. The nut 148 is now applied to rigidly hold the workpiece 166 in assembly with the arbor 130, and the unit applied to a machine for turning or other cutting operations.

My invention is also adapted to the formation of crown gears, i. e., gears whose teeth are skewed at the ends thereof to prevent excessive load thereat due to deflection of the shaft on which the gear is mounted. Where it is known in advance at which end of the tooth the load will tend to be excessive due to deflection of the shaft, it is common to skew the teeth only at that end, as shown in Fig. 13. Sometimes it cannot be anticipated which end of each tooth is going to be subject to excessive load due to the deflection of the shaft on which the gear is mounted, and in such event the gear teeth are skewed at both ends.

The grinding of crown gears heretofore has not been feasible, because of the resultant excessive tooth profile error. As a consequence, the shaving method has been employed. With the use of my machine and method, one or both end portions of each gear tooth can be skewed very easily, and, as the axis of the pivot assembly 70 can be located in a plane normal to the gear axis and midway of the length of each skewed portion of the gear teeth, or midway of the entire length of the gear teeth, if desired, tooth profile error relative to the gear axis is minimized.

With a spur gear mounted on a suitable arbor supported on the headstock and tailstock centers 28 and 32 in the manner above described, the pivot assembly 70 adjusted and secured with its axis 180 in a plane normal to the axis of and midway or substantially midway of the length of the gear, as shown in Figs. 14 and 15, and the table 24 swiveled about said axis to the desired skew adjustment, as shown exaggeratedly in Figs. 10 and 15, and then clamped by the screws 112 to the bed 22, the formed grinding wheel 182 is adjusted to the proper depth and operated to cut, in each pass, a skew surface 184 at one end 186 of one side 188 of each gear tooth 190 and an identical but oppositely facing skew surface 192 at the other end 194 of the juxtaposed side 196 of the adjacent gear tooth 190. After all of the passes are made with the aforesaid adjustment, the table 24 is unclamped from the bed 22, swiveled about the pivot assembly axis 180 in the direction opposite to the first direction, but through the same angle, to the desired taper adjustment, as shown exaggeratedly in Fig. 11, reclamped in that adjustment to the bed, and the grinding wheel 182 is then caused to make passes as before, to cut the skew surfaces 200 and 202 at the respective ends of the mutually facing sides 188 and 196 of adjacent gear teeth 190, thereby completing the crowning of the gear.

Using the method just described with a gear of relatively short axial length, the skew surfaces, while not of perfect tooth profile, are substantially so for practical purposes. If it is desired to crown the gear with somewhat greater tooth profile accuracy, or if the axial length of the gear is relatively great, the method described above in connection with the formation of the two-piece arbor 130 may be employed, the axis of the pivot assembly 70 being first located in a plane normal to the gear axis and midway of the axial length of the skew surfaces to be formed at one end of the gear, and making two sets of passes, one for each angular adjustment of the table 24 to form with one set of passes the skew surfaces 184 and with the second set of passes the skew surfaces 200, then reversing the arbor 94 with the gear mounted thereon between the headstock and tailstock centers 28 and 32, securing the pivot assembly 70 with its axis in a plane midway of the axial length of the skew surfaces 192 and 202 to be formed adjacent that end 194 of the gear, and making two more sets of passes with the grinding wheel as before with the table respectively in the same two different angular adjustments relative to the bed 22.

The taper is of course extremely slight. The skew surfaces 184, 192, 200 and 202 afford poor bearing for light loads and good bearing for heavy loads. The untapered portions of the gear teeth 190 afford good bearing for light loads and poor bearing for heavy loads. If the load is one sided and the side is known, only the corresponding end portion of one side of each side of each tooth is ground skewed, the other side of the tooth being left parallel throughout its length to the axis of the gear. Or, as shown in Fig. 13, a gear may be skew-ground on both sides at one end only.

Manifestly, if desired the sides of each tooth may be skew cut at different angles.

In some installations, where power is transmitted by gearing, one of the shafts, when under no or slight load, extends parallel to the shaft in drive relation thereto, but, when under full load, flexes substantially, with the result that, if the teeth of both gears are parallel at no load, there is substantially only end tooth contact at full load. It is in such cases desirable that the load contact situation be reversed, so as to afford substantially complete tooth contact at full load and relatively poor contact at slight or no load. To this end it is desirable under these conditions that one of the gears be a skew gear. The shaft flexure is relatively slight, and accordingly the skew angle is very slight. It is of course important that the skew teeth have very accurate profile to insure adequate gear tooth contact area at full load. There was heretofore no simple method of grinding a true skew gear, because of excessive tooth profile error, so that the shaving method had to be resorted to. However, a skew gear with very highly accurate tooth profile can be made easily with my apparatus and method, as may be understood from the foregoing. In making a skew gear according to my invention, a workpiece 206 is mounted on an arbor, the unit so assembled is mounted on the centers 28 and 32, the pivot assembly 70 is clamped in place with its axis in a normal plane midway or substantially midway of the length of the workpiece, the table 24 is adjusted to the desired skew angle, a suitable formed grinding wheel 208 is adjusted to the proper depth of cut, and the machine operated to enable the grinding wheel to cut the skew gear teeth. All of such teeth have perfect tooth profile, relative to the gear axis in said plane, and the profile at opposite sides of said plane, while progressively varying from the perfect toward the ends of the gear, is very close to perfect due to the proximity to said plane and to the fact that the skew angle is very small. Accordingly when the skew gear thus formed (see Fig. 12) is secured to a shaft and meshes with a gear on another shaft, and one of the shafts flexes under full load, there will be in practice substantially complete tooth-to-tooth load contact throughout a major or at least a substantial portion of the intermediate length of the skew teeth, the extent of such contact varying with the amount of the load.

Although the pivot assembly 70 is illustrated as located with its pivot axis intersecting the axis of the workpiece it will be appreciated that the pivot axis could be offset forwardly or rearwardly of the workpiece axis, the main requirement for skew cutting a side of a workpiece tooth being that the axis of the toothed portion of the workpiece intersect the median plane of the tooth form of the cutting member.

The methods employed according to my invention are not limited to grinding machines but are equally effective on milling machines and hobbing machines.

Various modifications coming within the spirit of my invention may suggest themselves to those skilled in the art, and hence I do not wish to be limited to the specific forms shown or uses mentioned, except to the extent indicated in the appended claims, which are to be interpreted as broadly as the state of the art will permit.

I claim:

1. A machine for cutting teeth in a cylindrical arbor, comprising a bed, a table on said bed, said bed and table having longitudinal slots which are adapted to be registered, pivot means disposed in both of said slots and adjustable therealong when said slots are registered, said table being capable of being pivotally adjusted about said pivot means relative to said bed, means for fixing said pivot means to said bed in the desired adjusted position thereof, means on said table for securing a cylindrical arbor with its axis intersecting a plane containing said pivot axis and normal to said arbor axis at a point intermediately of the length of said arbor, means for securing said table to said bed irrespective of said adjustment, a tooth-formed cutting member mounted and operative to cut a peripheral series of teeth in said arbor selectively parallel to the arbor axis, when said slots are in register, or parallel teeth or one side of each tooth in said arbor skew to said axis, when said slots are at an angle to each other, whereby the tooth profiles of the skew sides of said teeth in said plane will be identical with the profiles of the unskewed sides of said teeth.

2. A machine for bias-cutting a side of each tooth of a cylindrical spline tooth arbor, comprising a bed, a table on said bed, means pivoting said table to said bed, said pivoting means being adjustable lengthwise of said bed and table, means for fixing said pivoting means in the desired adjusted position thereof, means on said table for mounting a cylindrical arbor having spline teeth all of whose sides are parallel to its axis, with its axis intersecting a plane containing the axis of said pivoting means and normal to said arbor axis at a point intermediately of the length of said arbor, and a tooth-formed cutting member mounted and operative to cut one side of each arbor tooth skew to said arbor axis, whereby the tooth profiles of the skew sides of said teeth in said plane will be identical with the profiles of the other sides of said teeth.

3. A machine for skew-cutting a side of each tooth of a cylindrical spline tooth arbor, whereby one side of each tooth will remain parallel to the arbor axis and the other side of each tooth will be skew to the arbor axis, said machine comprising a bed having a longitudinal slot in the top thereof, said slot having the cross-sectional form of an inverted T, a table on the top of said bed and having a longitudinal slot, a headstock and a tailstock mounted on the top of said table and having co-axial centers, said table slot terminating adjacent the inner ends of said headstock and tailstock when said headstock and tailstock are in their endmost positions relative to said table, a pivot assembly comprising a nut disposed in the wide portion of said bed slot and non-rotatable therein, a bushing disposed in said table slot, and a bolt surrounded by said bushing and having an end threaded in said nut, whereby, when said bed and table slots are parallel and said bolt is loose, said pivot assembly may be shifted lengthwise of said slots within the limits defined by the ends of said table slot, and when said bolt is tightened, said table is pivotallly adjustable about the pivot assembly axis relative to said bed, means for securing said table to said bed in any such adjustment, a base on which said bed is movably mounted, and a tooth-formed spline tooth cutting tool arranged with its median plane fixed, the axis of said headstock and tailstock centers being located in said plane when the bed and table slots are parallel, whereby, when a spline arbor, with the sides of its teeth parallel to its axis, is mounted on said centers and said pivot assembly axis lies in a plane normal to the arbor axis at a point intermediately of the length of the toothed part of said arbor and said table is secured in an adjustment in which its slot is at an angle to said bed slot, said arbor axis will intersect said median plane at said point, so that said cutting tool is operative to skew cut a side of each arbor tooth, and the profile of such skew side of each tooth, in said normal plane, will be identical with the profile of the other side of each tooth.

4. A machine for skew-cutting a side of each tooth of a cylindrical spline tooth arbor, whereby one side of each tooth will remain parallel to the arbor axis and the other side of each tooth will be skew to the arbor axis, said machine comprising a bed having a longitudinal slot in the top thereof, said slot having the cross-sectional form of an inverted T, a table on the top of said bed and having a longitudinal slot, a headstock and a tailstock mounted on the top of said table and having co-axial centers, a pivot assembly comprising a nut disposed in the wide portion of said bed slot and non-rotatable therein, a bushing disposed in said table slot, and a bolt surrounded by said bushing and having an end threaded in said nut, whereby, when said bed and table slots are parallel and said bolt is loose, said pivot assembly may be shifted lengthwise of said slots, and when said bolt is tightened, said table is pivotally adjustable about the pivot assembly axis relative to said bed, means for securing said table to said bed in any such adjustment, a base on which said bed movably is mounted, and a tooth-formed spline tooth cutting tool arranged with its median plane fixed, the axis of said headstock and tailstock centers being located in said plane when the bed and table slots are parallel, whereby, when a spline arbor, with the sides of its teeth parallel to its axis, is mounted on said centers and said pivot assembly axis lies in a plane normal to the arbor axis at a point intermediately of the length of the toothed part of said arbor and said table is secured in an adjustment in which its slot is at an angle to said bed slot, said arbor axis will intersect said median plane at said point, so that said cutting tool is operative to skew cut a side of each arbor tooth, and the profile of such skew side of each tooth, in said normal plane, will be identical with the profile of the other side of each tooth.

5. A machine tool comprising a bed, a table supported on said bed, means on said table for supporting a cylindrical workpiece in position to have teeth cut therein, means pivoting said table to said bed, said pivoting means being translatably adjustable relative to said table to locate the pivot axis in a plane normal to and passing selectively throuugh any predetermined intermediate portion of the workpiece, means for supporting a tooth-formed cutter in position to cut teeth in the workpiece, and means for clamping said table to said bed when the workpiece axis is disposed selectively at any desired angle to the median plane of the cutter.

ARTHUR MACKMANN.

REFERENCES CITED

The following references are of record in the file of this patent:

UNITED STATES PATENTS

| Number | Name | Date |
| --- | --- | --- |
| 2,154,054 | Schurr | Apr. 11, 1939 |
| 2,157,981 | Drummond | May 9, 1939 |
| 2,161,269 | Zimmerman | June 6, 1939 |
| 2,165,386 | Klomp | July 11, 1939 |
| 2,206,492 | Westenberger et al. | July 2, 1940 |
| 2,347,998 | Drummond | May 2, 1944 |
| 2,362,873 | Wessman | Nov. 14, 1944 |
| 2,372,931 | Bregin | Apr. 3, 1945 |
| 2,429,250 | Wiken et al. | Oct. 21, 1947 |